United States Patent [19]
Sugi et al.

[11] 3,793,880
[45] Feb. 26, 1974

[54] REPEATING ELONGATION-FATIGUE TESTING MACHINE OF ELASTIC MATERIALS UNDER A CONSTANT LOAD

[75] Inventors: Nagatoshi Sugi, Yokohama; Hiichiro Yoshikawa, Kamakura; Hideo Isokawa, Kawasaki, all of Japan

[73] Assignee: Nippon Zeon Co. Ltd., Tokyo, Japan

[22] Filed: Sept. 15, 1972

[21] Appl. No.: 289,310

[52] U.S. Cl. ............................ 73/100, 73/91, 73/92
[51] Int. Cl. ............................................. G01n 3/32
[58] Field of Search ....................... 73/92, 91, 100

[56] References Cited
FOREIGN PATENTS OR APPLICATIONS
406,071   6/1922   Germany............................ 42 K/20

Primary Examiner—James J. Gill
Assistant Examiner—Anthony V. Ciarlante
Attorney, Agent, or Firm—Finnegan, Henderson, Farabow & Garrett

[57] ABSTRACT

A hydraulically operated elongation-fatigue machine for testing elastic materials. The machine includes a hydraulic and mechanical reciprocating drive system actuated by limit switches and solenoid valve.

4 Claims, 1 Drawing Figure

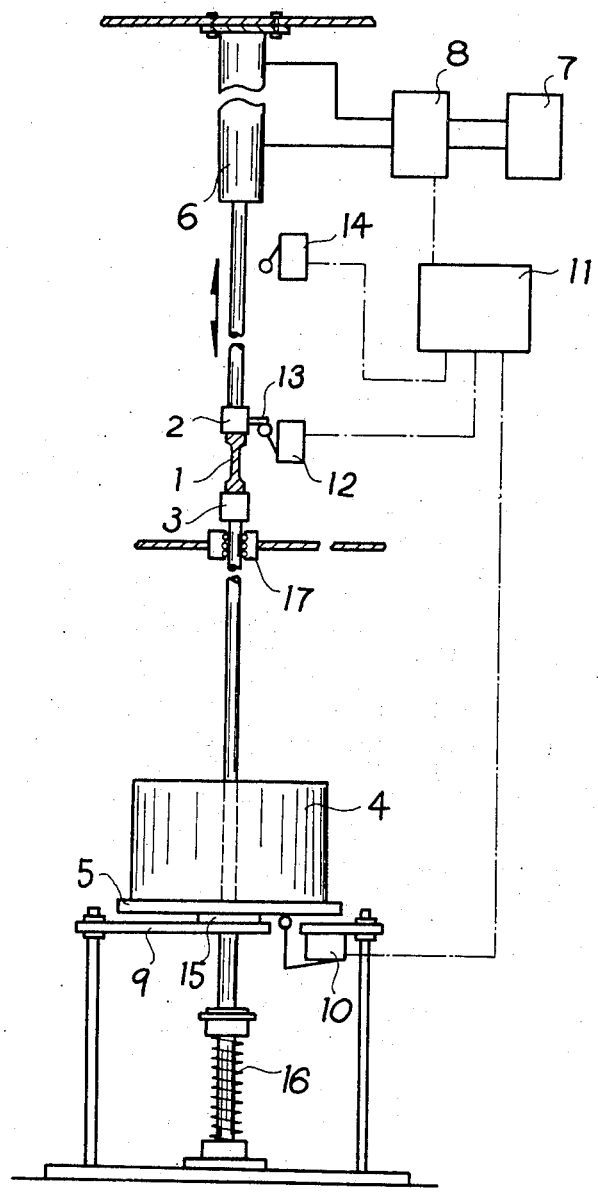

REPEATING ELONGATION-FATIGUE TESTING MACHINE OF ELASTIC MATERIALS UNDER A CONSTANT LOAD

SPECIFICATION

This invention relates to a repeating elongation fatigue testing machine of elastic material under a constant load, and more particularly to a fatigue machine of the type in which the repeating elongation test under a constant load to rubber or other elastic material may be performed, maintaining the maximum load to be constant through the use of a load.

Known by the prior art there are types of fatigue testing machines in which elastic materials can be elongated by repeatedly applying a constant load thereto such as the Instron type fatigue testing machine driven by a worm gear (produced by Instron Corp. U.S.) or elongation fatigue testing machines driven by hydraulic pessure or the like in whch elongation fatigue at a repeatedly applied constant load can be measured, controlling a driving portion through the detection of stress by the use of a load cell.

Although above mentioned testing machines such as the Instron type possess inherently the construction of a tension fatigue tester which, therefore, can be mechanically applied to fatigue testing, said testing machines are not suitable for a long time repeating test since they are provided with complicated servo circuits and equipments, and they are unfavorable from the economical point of view to use them exclusively for fatigue testing.

The repeating elongation fatigue test under a constant load enables a plurality of samples to be tested at the same time for the purpose of performing a test series effectively within a limited time. However, the above said conventional testing machines, due to the mechanisms thereof, merely permit simultaneous performances of numerous or parallel fatigue tests at a fixed strain and so that it is necessary to employ an individual testing head for each sample in order to carry out the numerous fatigue tests at a constant load.

In practice, there are many difficulties in employing a number of said testing heads necessitating complicated machines and control circuits for exclusive use for each sample.

Therefore, the object of the testing machine of this invention is to overcome the above mentioned difficulties, simplify the structure of the fatigue testing machine of elastic material elongated by repeatedly applied constant load and further more facilitate the performance of many parallel test series.

That is to say, a preferred embodiment of this invention is a fatigue testing machine for elastic materials repeatedly elongated under constant loads comprising upper and a lower grips grasping individual samples by an upper end and a lower end thereof, a hydraulic cylinder machanism and other mechanical drive equipment for raising the upper grip grasping said sample at its upper end at a constant speed, a load supporting structure provided below the lower grip and connected to said grip so as to apply a constant load to the sample together with the rise of the upper grip of the sample, and a load base and a load placed on the load supporting structure, wherein the weight of said load is selected appropriately in accordance with a desired load to be applied on the sample after the upper grip is raised by the hydraulic system so as to exert the load on the sample and said load reaches the weight of said load; the change of the postion of the load supporting structure separated from the load base may be detected by a limit switch and the ascending operation of the hydraulic system and other mechanical drive equipment may be changed into the descending operation in order to thereby bring said upper grip back to the original no load position, and which position may be detected by another limit switch to change the movement of the hydraulic system and other mechanical driving equipment into ascending motion.

Now the present invention of this application will be described in more detail with reference to the accompanying drawing, in which the drawing is a single FIGURE illustrating an explanatory view showing the structural construction of the fatigue testing machine according to the present invention, in which the machine is in the condition where the sample is set, and relaxed.

Referring to the FIGURE, the discussion on the operation of the fatigue testing machine in accordance with the present invention will be given herein below.

A sample 1 such as rubber piece is held or grasped by an upper grip 2 and a lower grip 3 and a load 4 having a weight which corresponds with the desired weight of the load to be applied on a weight supporting structure 5, then the operation of the testing machine is started.

At first a hydraulic system 6 and other mechanical drive equipment 7 start their as-cending movement by means of a hydraulic system 6 and a solenoid valve 8, so that the sample 1 is gradually elongated at a constant speed. When such elongation has reached the weight 4 of the load exerted on the sample 1, the weight supporting structure 5 is raised from a load base 9 to actuate a limit switch 10 secured to the base 9.

The operation of the limit switch 10 is such that it actuates a relay circut 11 in order to change over the solenoid valve 8, thus the direction of hydraulic pressure generated from a pump 7 is changed and the ascending movement of the system 6 is changed into the descending movement. Accordingly, with the sample elongated, the load 4 and a load supporting structure 5 are lowered to actuate a limit switch 10 secured on the weight base 9 to reverse the operation. After the limit switch 10 is deenergized a piston (not numbered) in the hydraulic system 6 still descends more for the extent of the elongation of the sample and operates a limit switch 12 at the position where the length of the sample reaches the original length. The operation of the limit switch 12 causes said relay circuit 11 to operate so as to put the solenoid valve 8 back to the original position and thereby operate the hydraulic system and the mechanical drive equipment so as to cause the hydraulic system cylinder to ascend again.

From the foregoing it will be apparent that the present invention provides repeating elongation fatigue tests under a cnstant load in which the above mentioned operation is repeated until the sample fails and the number of the cycles can be counted by a counter or the like (not shown). In case the sample has an extraodinarily high fatigue the ascending movement of the system 6 may be limited in suc a manner that a limit swtich 14 placed at an upper limit position is operated, for example, by a contact member 13 per se of the upper grip 2 as shown in the FIGURE to chaneover the solenoid valve 8 and stop the operation of the hydraulic system 6 and other mecanical drive equipment. This upper limit control also may be attained in any other way including electrical or mechanical means.

Furthermore, in the drawing, 15 designates a buffering means to allow the load 4 and support 5 to touch down on the member 9 gently, 16 is a zero-load adjusting spring for balancing a load other than the desired weight and 17 is a slide bearing for preventing the horizontal movement of the lower grip 3 of the sample.

With this structure of this invention, any load can be used, which is selected at will among the loads between the lower limit determined by the frictional force at the sliding parts of the fatigue testing machine and the upper limit determined by the area of available space and strength of the structure of the test machine, so that various loads of wide range can be used on the repeating fatigue test of this invention. Furthermore, since, the test machine has a very simple structure and can be handled easily in case that a number of samples is tested simultaneously, each sample can be tested at individual test heads in parallel. Owing to the installation of the limit switch 14 for the upper limit, a long time continuous fatigue test may be performed and the test result may be recorded fully automatically. In this way, the various industrial advantages may be attained.

What is claimed is:

1. In a fatigue testing machine for elastic material repeatedly elongated under a selected load using loading means to load and unload a sample of elastic material to be tested, which sample is grasped at both ends by upper and lower grips respectively wherein the upper grip is connected to said loading means for reciprocating movement, the fatigue testing machine comprising:

a weight used to apply a load on said sample when said upper grip is raised until the load on said sample is equal to said weight;
   a stationary weight base;
   a weight supporting structure provided below the lower grip and resting on said stationary weight base, said structure being connected to said lower grip so as to apply a load to said sample during the rise of the upper grip wherein said load applied on said sample starts from 0 and increases until equal to said desired weight;
   a first sensing means responsive to the change of the position of the lower end of said sample and actuating said loading means to cause the upper grip to move back toward the positon when said first sensing means detected the change of the position of the lower end of said sample; and
   a second sensing means responsive to the arrival of the upper grip, after descending movement, at the original position at which the load applied to the sample becomes zero and actuating said loading means to cause the upper grip to ascend.

2. A fatigue testing machine according to claim 1 in which said first limit switch is secured on said weight base and detects the change of the position of said load supporting structure as it is separated from the weight base during ascending movement of the upper grip.

3. A fatigue testing machine according to claim 1 in which said weight base is provided with a zero load adjusting structure to cancel the weight of said lower grip and the weight of said weight supporting structure.

4. A fatigue testing machine according to claim 1 including third sensing means responsive to arrival of the upper grip at the upper limit of desired movement of said upper grip, said third sensing means effecting termination of further upward movement of said upper grip.

* * * * *